Figure 1:
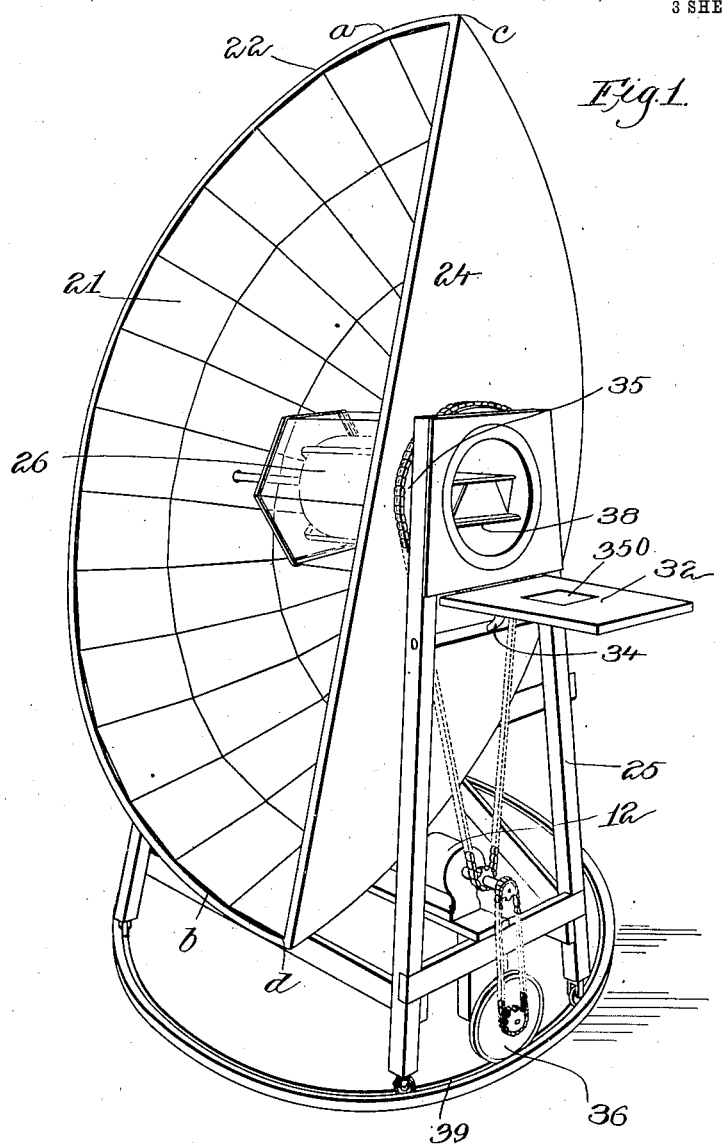

No. 820,127. PATENTED MAY 8, 1906.
C. H. POPE.
APPARATUS FOR THE UTILIZATION OF SOLAR HEAT.
APPLICATION FILED FEB. 13, 1905.

3 SHEETS—SHEET 1.

Witnesses.
W. C. Lunsford
Arthur W. Knapp.

Inventor
Charles H. Pope,
by Crosby Gregory
Attys.

No. 820,127. PATENTED MAY 8, 1906.
C. H. POPE.
APPARATUS FOR THE UTILIZATION OF SOLAR HEAT.
APPLICATION FILED FEB. 13, 1905.
3 SHEETS—SHEET 2.
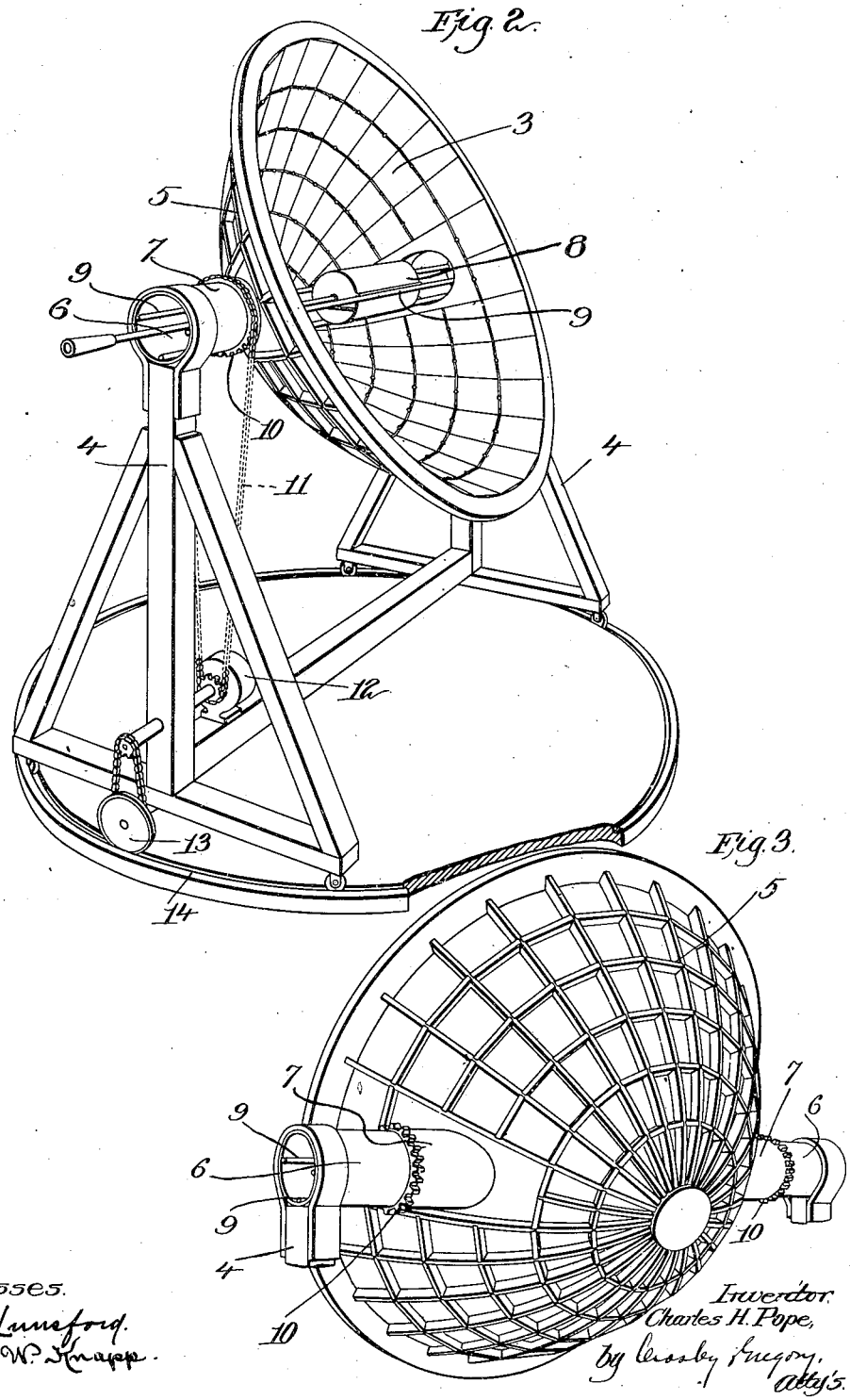

No. 820,127. PATENTED MAY 8, 1906.
C. H. POPE.
APPARATUS FOR THE UTILIZATION OF SOLAR HEAT.
APPLICATION FILED FEB. 13, 1905.
3 SHEETS—SHEET 3.
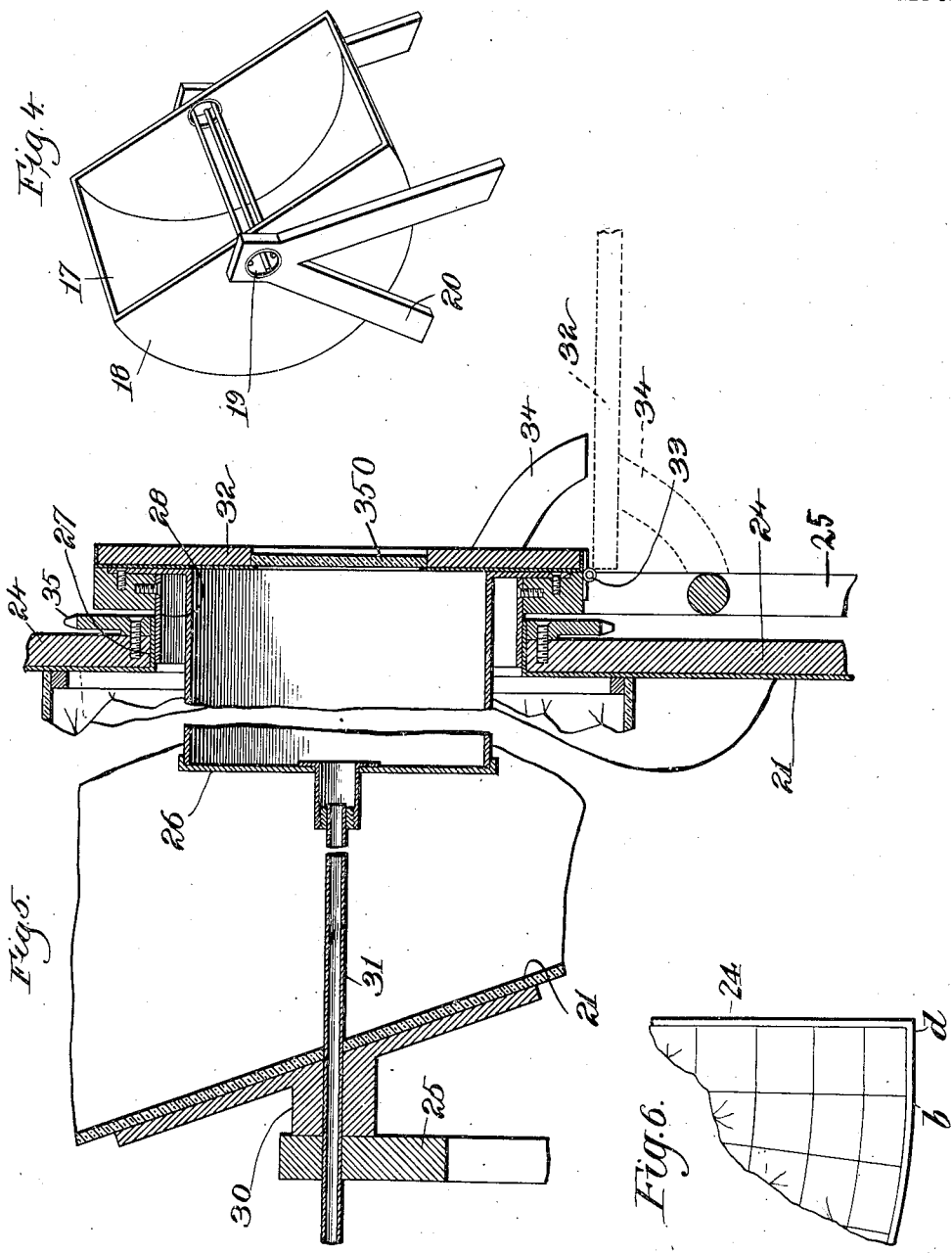
Witnesses.
W. C. Lunsford
Arthur W. Knapp
Inventor:
Charles H. Pope,
by Crosby Gregory
Attys.

UNITED STATES PATENT OFFICE.

CHARLES HENRY POPE, OF CAMBRIDGE, MASSACHUSETTS.

APPARATUS FOR THE UTILIZATION OF SOLAR HEAT.

No. 820,127.        Specification of Letters Patent.        Patented May 8, 1906.

Application filed February 13, 1905. Serial No. 245,338.

*To all whom it may concern:*

Be it known that I, CHARLES HENRY POPE, a citizen of the United States, residing at Cambridge, in the county of Middlesex and State of Massachusetts, have invented an Improvement in Apparatus for the Utilization of Solar Heat, of which the following description, in connection with the accompanying drawings, is a specification, like characters on the drawings representing like parts.

This invention relates to apparatus for the utilization of solar heat, and has for its principal object to provide a novel way of mounting the chamber or receptacle on which the rays of the sun are concentrated, whereby said receptacle is always maintained in a given position regardless of the position which the means for concentrating the sun's rays may assume.

In most solar apparatus with which I am now familiar the chamber on which the sun's rays are concentrated is fixed with relation to the means for concentrating said rays and partakes of its movement. The result is that said chamber assumes a great variety of positions during the course of the day, and therefore it is extremely difficult, if not impossible, to keep the contents of the chamber in any fixed position.

When the solar apparatus is used for some purposes—for instance, for baking articles in the chamber, melting metal in a crucible, &c.—it is essential that the chamber or crucible be maintained in such a position that the articles being baked or the melted metal, &c., will not be spilled or disturbed, and it is to provide a solar apparatus in which this desideratum is realized that I have made my present invention.

In the preferred form of my invention and that which I have herein illustrated the means for concentrating the sun's rays at a focal region (which means I will hereinafter refer to as the "concentrating means") is in the nature of reflecting-surfaces arranged to reflect the sun's rays to the focal region, although the invention would not be departed from if the concentrating means were in the nature of refractors, or refractors and reflectors combined, or were of any suitable nature.

The concentrating means is mounted on and turns about a suitable hollow axle, which axle preferably stands in a horizontal position and which passes through the focal region, and the axle and the supported concentrating means are arranged to turn about a vertical axis. By means of this construction the concentrating means may be made to face the sun at all times of the day. The hollow axle on which the concentrating means is mounted for turning movement may constitute or contain the chamber to be heated whether said chamber be in the nature of a generating-chamber for generating motive fluid or be in the nature of a retort, or in the nature of an oven, or whatever be its nature, and said chamber is situated in the focal region of the concentrating means. The axle on which the concentrating means is supported is fixedly mounted on a stand, and therefore has no movement about the horizontal axis of movement of the concentrating means, and as a result the chamber or article to be heated always occupies a horizontal position regardless of the position of the concentrating means. It is possible, therefore, to use my apparatus in a great many ways which would not be possible if the material to be heated were supported in such a way that it partook of the movement of the concentrating means. The axle is open at one or both ends, and the open end or ends constitutes the opening through which that which it is desired to heat is introduced into the chamber or hollow axle and withdrawn therefrom. The open end or ends of the axle are situated exterior to the concentrating means, and as the axle is stationary, except for its movement about a vertical axis, the material to be heated may be very readily put into place regardless of the position of said concentrating means. Furthermore, the axle is supported at its ends, and the support therefore is entirely outside of the concentrating means, and also the bearing of the concentrating means on the axle is entirely exterior to said concentrating means. These features I regard as important, because by reason of them I can use a concentrating means having a continuous reflecting-surface which is not interrupted or broken up to make room for either the support for the axle or the bearing of the concentrating means on the axle. In case my invention is embodied in an apparatus for heating air or generating steam or other motive fluid the generating-chamber, which may be constituted by the hollow axle or by a chamber located therein, is connected with the water supply or motor through the ends of the axle, and because of the fixed position of the generating-chamber such connection is much more simple than is possible where the generating-chamber is fixed with relation to the concentrating means and partakes of all its movements.

In the drawings, Figure 1 is a perspective view of a solar apparatus embodying my invention. Fig. 2 is a perspective view of another apparatus embodying my invention. Fig. 3 is a back side view of the apparatus shown by Fig. 2. Fig. 4 is a perspective view of still another apparatus embodying my invention. Fig. 5 is a vertical section through the axle in Fig. 1. Fig. 6 is an elevation of the lower corner of the reflector shown in Fig. 1.

In the drawings I have illustrated three possible shapes for my concentrating means, and in each instance said concentrating means is in the nature of a reflecting-surface. In Fig. 2 the reflecting-surface is a concave parabolic reflector. In Fig. 4 it is a cylindrical reflector, and in Fig. 1 it is a combination surface made up of one-half of a parabolic surface and a cylindrical surface, the latter being arranged as an extension to the parabolic surface.

Referring now to Fig. 2, 3 designates the reflecting-surface, which, as above stated, is a parabolic surface, and 4 is a stand or support on which the reflector is mounted. This reflecting-surface is made of silvered glass or other reflecting material supported by a framework 5 of any suitable or appropriate construction.

6 designates the hollow support or axle on which the reflecting-surface is mounted. The framework 5, which supports the reflecting-surface, is provided with bearing-sleeves or journals 7, through which the hollow axle 6 projects and which turn about said axle. These bearing-sleeves are located entirely on the exterior of the frame and are therefore exterior to the reflecting-surface. The hollow axle 6 is supported in a suitable stand 4, the stand being arranged to support the axle at its ends exterior to the reflecting-surface and also to the bearing-sleeves 7. The axle 6 forms the horizontal axis about which the reflecting-surface turns, and it is so located as to extend through the focal region of the reflector. By placing the bearings for the reflecting-surface entirely exterior to the framework 5 and by making the support for the hollow axle entirely exterior to the concentrating means I am enabled to employ a practically continuous concentrating-surface no part of which has to be removed to make room for the support for the hollow axle or the bearings of the concentrating means upon said axle.

The chamber on which the sun's rays are to be concentrated may be either that portion of the axle which occupies the focal region or may be a separate chamber located either within the axle at this place or in the line of the axle, according to the particular use to which the device is to be put. In Fig. 2 said chamber is a separate chamber 8, located in the line of the hollow axle, and therefore said axle is cut away at the focal region, so as to allow the sun's rays to impinge directly on the chamber to be heated. The two ends of the axle are connected together in some suitable way, as by tie-rods 9, and these rods may also form guide or supporting rods to support the chamber 8 to be heated.

The reflecting-surface may be maintained in a proper position to receive the sun's rays by any suitable mechanism. That herein shown for giving the movement about a horizontal axis is simply a sprocket-wheel 10 on one of the bearing-sleeves 7, with which coöperates a sprocket-chain 11, operated by any suitable motor 12, and that illustrated for giving the movement about a vertical axis is merely a friction or propelling or traction wheel 13, carried by the stand and operating in a trackway 14, said propelling-wheel being driven by any suitable mechanism, preferably the motor 12.

The trackway 14 guides the whole apparatus in its movement and causes it to turn about a fixed vertical axis.

It will be noted that the hollow axle 6 is of considerable size and is open at one or both ends. This permits me to place the chamber to be heated in the focal region through the open end of the axle, said chamber when in this position resting on and being supported by the guide-rods 9.

From the above it will be apparent that the guide-rods 9, and therefore any article supported thereby, is not affected by the movement of the reflector about the axle 6, and therefore it is possible to use my device not only for baking purposes, but also for melting a metal in crucibles and for other similar purposes where it is essential that the chamber or vessel to be heated should not be tipped.

It will also be seen that both the support for the hollow axle and the bearings of the concentrating means upon the axle are entirely exterior to the reflecting-surface.

In Fig. 4 I have illustrated another form of my invention wherein the reflecting-surface 17 is cylindrical instead of parabolic. Said reflecting-surface is carried by a suitable framework 18, which is supported to turn about the hollow axle 19, carried by the stand or support 20, said hollow axle extending through the focal region of the reflecting-surface. In this form of the invention the pivotal movement of the reflector is also about an axis which extends through the focal region. Both the support for the hollow axle and the bearings for the concentrating means upon said axle are exterior to the reflecting-surface.

In Fig. 1 I have illustrated a slightly-different form of my invention in which the reflecting-surface is a combination of a semiparabolic and cylindrical surface. The reflecting-surface is designated by 21 and is carried by any suitable frame 22. The portion of the surface between the points *a* and *b* is semiparabolic, and the portion between the points *b* and *d* and *a* and *c* is cylindrical. In this form of the invention the frame supporting the reflecting-surface is made with the end piece 24, which stands parallel to the sun's rays and at right angles to the horizontal axis of motion.

25 designates a stand or support on which the reflector is mounted, said stand being arranged to turn about a vertical axis in any suitable way. Carried by the stand is a chamber 26, which lies in the axis of rotation of the reflector and constitutes or contains the chamber on which the sun's rays are concentrated.

The end piece 24 of the reflector is provided with a bearing-sleeve 27, which is exterior to the reflector and which encircles and rotates on a sleeve or journal 28, carried by the frame 25. The side of the reflector opposite the end 24 is provided with an exterior bearing 30, through which extends a journal or pivotal pin 31, connected at one end to the frame 25 and at the other end to the chamber 26. The frame 25 is so shaped that the entire concentrating means is received between the two legs or sides thereof, and the bearing of the said concentrating means and the support 25, too, is therefore located entirely exterior to the concentrating means. This permits me to use a continuous reflecting-surface, none of which is removed to make room for either the bearings of the concentrating means or the support 25.

32 designates a door for the open end of the chamber 26, which is pivoted to the frame 25, as at 33, and 34 is a stop-arm carried by the door and which by engagement with the frame 25 holds the door in a horizontal position when it is open. Said door can thus be used as a shelf to support articles being put into or taken out of the chamber 26. Said door is preferably provided with a window 350, so that the condition of the articles in the chamber 26 may be observed.

The reflector may be given its two movements by any suitable means—such, for instance, as that above described—which comprises a suitable motor 12, carried by the frame and operatively connected to a sprocket-wheel 35, fast on the end piece 24, and also operatively connected to a propeller-wheel 36, carried by the stand 25 and operating in the trackway 14.

If the chamber 26 is to be used as an oven, as illustrated in the drawings, it will preferably be provided with a shelf 38, on which the articles to be baked may be supported.

When the chamber 26 is to be used for generating steam or for similar purposes, the pivotal pin 31 is made hollow or in the form of a tube, and the device in which the steam or other motive fluid is to be used will be connected to the outer end of the pipe or tube 31. When used as an oven, the outer end of this tube may be closed by a suitable plug or may be left open to permit the escape of steam or gas as desired.

It will be observed that in all of the above forms of my invention the chamber on which the sun's rays are concentrated is located in the axis of rotation of the reflector and is fixed with reference to the movement of the reflector about said axis. This I regard as very important, because said chamber always occupies a horizontal position regardless of the position of the reflector, and by means of this simple expedient the sphere of application of the invention is greatly increased.

Another feature which I regard as very important is the manner of placing the material to be heated into the focal region and withdrawing it therefrom, this being done through the open end or ends of the hollow axle. This feature is particularly advantageous where the device is used as an oven or for melting ore and similar material in crucibles.

Another feature of my invention which I regard as important is placing the bearings of the concentrating means upon the hollow axle and also the entire support for the hollow axle entirely exterior to said concentrating means, because this construction permits me to employ a reflecting-surface which is not interrupted to make room for either the bearings or for the support.

In the above specification and in the following claims I have used the word "axle" as designating the support on which the concentrating means is mounted to rotate. In all forms of my invention this support is hollow and is provided with an open end. It is not essential to the invention that the hollow axle be closed, except at the end, or, in other words, that the axle be tubular throughout its length. It is within my invention to make this hollow axle with a skeleton work at its central portion, as shown in Fig. 2, so that the sun's rays may be made to impinge directly on the article to be heated.

I believe that I am the first to construct an apparatus for the utilization of solar heat in which the concentrating means is mounted upon an open-ended hollow axle, and therefore I desire to claim this feature broadly.

While I have shown some few ways in which my invention may be embodied, I do not wish to be limited to the constructions illustrated. It will be understood, therefore, that many changes may be made in the construction of the device without departing from the invention.

Having fully described my invention, what I claim as new, and desire to secure by Letters Patent, is—

1. In an apparatus for the utilization of solar heat, a hollow axle open at one end for the reception of the material to be heated, and concentrating means mounted on said axle to turn thereabout, the bearings of the concentrating means on the axle being entirely exterior to said concentrating means, and the axle passing through the focal region of the concentrating means.

2. In an apparatus of the class described, a reflector having bearings exterior to the reflecting-surface, a hollow axle passing through the bearings and through the focal region of the reflecting-surface, and means exterior to said reflecting-surface to support the hollow axle.

3. In an apparatus of the class described, a horizontal hollow open-ended reflector-support, a reflector provided with bearings to turn on said support, and means entirely exterior to the reflector for supporting the hollow reflector-support, said hollow support passing through the focal region of the reflector, and the bearings of the reflector on said support being exterior to the reflector.

4. In an apparatus of the class described, a reflector provided with bearings entirely exterior to the reflecting-surface, an open-ended horizontal hollow axle extending through the bearings and projecting beyond the same, and a stand for supporting the hollow axle, said stand being entirely exterior to the reflector and mounted to turn about a vertical axis.

5. In an apparatus of the class described, an open-ended hollow axle, a reflector pivotally mounted on said axle, said reflector having a parti-parabolic reflecting-surface, which merges into a cylindrical surface said axle passing through the focal region of the reflector.

6. In an apparatus of the class described, a stand or support mounted to turn about a vertical axis, an open-ended hollow axle fixedly secured to said stand or support, and a reflector pivotally mounted on said hollow axle, said reflector having a reflecting-surface, part of which is semiparabolic, and part of which is cylindrical.

7. In an apparatus for the utilization of solar heat, a hollow open-ended axle, and a reflector mounted thereon to turn thereabout, said reflector having a side extending at right angles to the axle and the open end of said axle projecting through said side.

8. In an apparatus for the utilization of solar heat, a horizontal hollow open-ended support for a reflector, a reflector mounted on said support to turn thereabout, and having a side extending at right angles to its axis of movement the open end of said support extending through said side, and a door provided with a window or sight-opening to close the open end of the support.

9. In an apparatus for the utilization of solar heat, a horizontal hollow open-ended support for a reflector, and a semiparabolic reflector mounted on said support to turn thereabout, said reflector having a side parallel to its axis through which the open end of the support extends.

10. In an apparatus for the utilization of solar heat, a horizontal hollow open-ended support for a reflector, a reflector mounted on said support to turn thereabout the bearing of the reflector on said support being exterior to the reflector, said reflector having a side perpendicular to its axis of motion about the support through which the open end of the support extends, and a door for said open end, said door being provided with a window or sight-opening.

11. In an apparatus for the utilization of solar heat, a hollow open-ended reflector-support, a reflector mounted on the support to turn thereabout, said reflector having a parti-parabolic reflecting-surface, and a side extending perpendicular to its axis of motion through which side the open end of the support extends.

12. In an apparatus of the class described, a rotatable reflector having an end or side perpendicular to its axis of motion, and provided with bearings exterior to the reflecting-surface, one of said bearings being on the exterior of said side, a hollow open-ended reflector-support extending through the bearings and through the focal region of the reflector, the open end of said support being exterior to the bearings on the side of the reflector.

13. In an apparatus of the class described, a rotatable reflector having an end or side perpendicular to its axis of motion and provided with bearings exterior to the reflecting-surface, one of said bearings being on the exterior of said side, a hollow open-ended reflector-support extending through the bearings and through the focal region of the reflector, the open end of said support being exterior to the bearings on the side of the reflector, and a stand for sustaining the reflector-support, said stand being entirely exterior to the reflector.

In testimony whereof I have signed my name to this specification in the presence of two subscribing witnesses.

CHARLES HENRY POPE.

Witnesses:
   LOUIS C. SMITH,
   MARGARET A. DUNN.